United States Patent
Lester et al.

(10) Patent No.: US 7,689,705 B1
(45) Date of Patent: Mar. 30, 2010

(54) INTERACTIVE DELIVERY OF MEDIA USING DYNAMIC PLAYLIST GENERATION SUBJECT TO RESTRICTIVE CRITERIA

(75) Inventors: James P Lester, San Francisco, CA (US); Alexander J Kirk, San Francisco, CA (US)

(73) Assignee: RealNetworks, Inc., Seattle, WA (US)

( * ) Notice: Subject to any disclaimer, the term of this patent is extended or adjusted under 35 U.S.C. 154(b) by 1624 days.

(21) Appl. No.: 10/021,752

(22) Filed: Oct. 29, 2001

Related U.S. Application Data

(60) Provisional application No. 60/244,079, filed on Oct. 27, 2000.

(51) Int. Cl.
*G06F 15/16* (2006.01)
(52) U.S. Cl. .............. 709/231; 709/232; 709/203; 705/51; 707/102; 707/104.1
(58) Field of Classification Search ............ 709/203, 709/231, 232; 705/51; 707/102, 104.1
See application file for complete search history.

(56) References Cited

U.S. PATENT DOCUMENTS

| | | | | |
|---|---|---|---|---|
| 5,155,591 A | 10/1992 | Wachob | ............... | 358/86 |
| 5,319,455 A | 6/1994 | Hoarty et al. | ............... | 348/7 |
| 5,404,566 A | 4/1995 | Wehrmeyer | ............... | 455/6.3 |
| 5,557,242 A | 9/1996 | Wetherell | ............... | 331/17 |
| 5,557,541 A | 9/1996 | Schulhof et al. | ............. | 365/514 |
| 5,787,399 A | 7/1998 | Lee et al. | ............... | 704/270 |
| 5,819,160 A | 10/1998 | Foladare et al. | .............. | 455/45 |
| 5,892,825 A | 4/1999 | Mages et al. | ............... | 380/3 |
| 5,931,901 A | 8/1999 | Wolfe et al. | ............... | 709/206 |
| 5,937,164 A | 8/1999 | Mages et al. | ............. | 395/200.48 |
| 5,996,015 A * | 11/1999 | Day et al. | ............... | 709/226 |
| 6,006,257 A | 12/1999 | Slezak | ............... | 709/219 |
| 6,035,329 A | 3/2000 | Mages et al. | ............... | 709/217 |
| 6,202,056 B1 | 3/2001 | Nuttall | ............... | 705/52 |
| 6,243,725 B1 * | 6/2001 | Hempleman et al. | ........ | 715/210 |
| 6,248,946 B1 * | 6/2001 | Dwek | ............... | 84/609 |
| 6,526,411 B1 * | 2/2003 | Ward | ............... | 707/102 |
| 6,662,231 B1 * | 12/2003 | Drosset et al. | .............. | 709/231 |
| 6,859,791 B1 * | 2/2005 | Spagna et al. | ............... | 705/51 |
| 6,882,793 B1 * | 4/2005 | Fu et al. | ............... | 386/95 |
| 7,325,043 B1 * | 1/2008 | Rosenberg et al. | .......... | 709/219 |
| 2001/0019604 A1 | 9/2001 | Joyce et al. | .............. | 379/114.2 |
| 2001/0025259 A1 * | 9/2001 | Rouchon | ............... | 705/26 |
| 2001/0044851 A1 * | 11/2001 | Rothman et al. | ............ | 709/231 |
| 2002/0010759 A1 * | 1/2002 | Hitson et al. | ................ | 709/219 |
| 2002/0082901 A1 * | 6/2002 | Dunning et al. | ............... | 705/10 |
| 2003/0135464 A1 * | 7/2003 | Mourad et al. | ............... | 705/50 |
| 2005/0038819 A1 * | 2/2005 | Hicken et al. | ............ | 707/104.1 |

FOREIGN PATENT DOCUMENTS

WO     WO 00/44171     7/2000

\* cited by examiner

*Primary Examiner*—Nathan Flynn
*Assistant Examiner*—Mohammad A Siddiqi
(74) *Attorney, Agent, or Firm*—Axios Law; Adam L. K. Philipp

(57) ABSTRACT

A media delivery scheme distributes a stream of media files to a group of users while allowing individual users to request specific media files. In one embodiment, a media server maintains a playlist of media files to broadcast, and requests for media must satisfy certain restrictive criteria to be added to the playlist. In another aspect of a preferred embodiment, the media server schedules requested media so as to comply with provisions of the DMCA.

20 Claims, 3 Drawing Sheets

INTERACTIVE DELIVERY OF MEDIA USING DYNAMIC PLAYLIST GENERATION SUBJECT TO RESTRICTIVE CRITERIA

This application claims priority under 35 U.S.C. §119(e) from U.S. provisional patent application Ser. No. 60/244,079, filed Oct. 27, 2000, which is hereby incorporated by reference.

BACKGROUND OF THE INVENTION

The invention relates to electronic media delivery, and more particularly, to interactive delivery of electronic media over a network to a group of users.

Advances in communications technology have enabled many new applications for delivery of electronic media over computer networks, such as the Internet. Because of this ability, people have increasingly turned to on-line sources for their various media requirements. The Internet has thus become a major source for providing users with music, in part replacing conventional radios and other means for receiving music entertainment. In the field of online music delivery, the two traditional methods for delivering music are radio-style "broadcasts" and single file requests.

Online, radio-style broadcasts deliver media in a continuous or streaming fashion to multiple clients, which are typically personal computers owned by users. Streaming media technology enables the real time delivery of audio, video, and multimedia over the Internet. With streamed media, a user does not have to wait until a download to their computer is complete before seeing the video or hearing the sound. Instead, the media files are sent in a continuous stream and are played by the client computer system as sufficient data is received and stored in the client's buffer for playing the media file. After being played, the streamed media file is not stored on the client, so the media will not take up space on the client's storage device. In a radio-style broadcast, a media service provider delivers a particular sequence of media files that has been compiled into a playlist before transmission of those files. To ensure compliance with the law and quality control, the playlists can be designed using a set of restrictive criteria. These restrictive criteria help to define the media that is broadcast. Media files are then broadcast according to this playlist, and users can "tune" into or out of the broadcast using either standard or proprietary software.

Sometimes, a broadcasting entity broadcasts specific programs of media over multiple "channels." With their client computers, users can tune into any of these channels to receive the corresponding media broadcast. Often, these channels are organized by genre of media, such as type of music in the case of audio delivery. Again, applying different restrictive criteria to the playlists that correspond to each channel helps to maintain a qualitative difference between the media content on the channels.

Traditional streaming media broadcasts allow users to tune into particular channels of interest, but they have not provided the ability to dynamically modify the playlist on the fly in response to requests from the users, nor have they offered the ability to apply restrictive criteria to those requests. As a result, users are limited to receiving selections in the playlist and cannot send requests to the server to broadcast other songs, videos, or other media items.

For single file requests, individual users request and retrieve single media files in isolation. Several files can be obtained by multiple file, or batch, requests. Services that allow users to download single files on demand can provide means for searching for desired media files on a database maintained by the service. Whether using single file or batch requests, these types of media file retrieval systems are typically not subject to restrictive criteria that limit delivery of the media. These media files are typically not played until fully downloaded, and seamless play is not provided. Moreover, receiving media via single file requests is time intensive, requiring each user to interactively select media files and facilitate the downloads. This method is therefore undesirable for users that simply wish to tune into a broadcast.

A significant barrier to entry for business to provide media delivery of copyrighted works is acquiring licenses or other rights to distribute the media. In the case of music delivery, acquiring licenses or rights for every piece of music for distribution could be a daunting task. In recognition of this burden, Congress passed the Digital Millennium Copyright Act (DMCA), which allows service providers to obtain a statutory license as long as fewer than a substantial portion of the programming consists of songs delivered within an hour of the request or at a time specified by the broadcaster. With a statutory license, a media service would be free to broadcast any commercially available recordings without negotiating individual licenses with the content owners, as long as the service complied with the DMCA. It would therefore be advantageous to provide a media delivery service that allowed for passive and active reception by an audience, while complying with the provisions of the DMCA to enable a service provider to obtain a statutory license.

BRIEF SUMMARY OF THE INVENTION

To provide the benefits of both radio-style broadcasts and single file request systems, a hybrid media delivery scheme distributes a stream of media files to a group of users while allowing individual users to request particular media files. In an embodiment, a media service provider broadcasts streaming media from a media server over a computer network to the client computers of each user in the group. Using client-side hardware and/or software, the users may each tune in and out of the broadcast. During a broadcast, individual users may send specific media requests from their client computers to a media server at the media service provider. The media server receives and processes each request. If a playlist including the requested media would meet a set of restrictive criteria, the media server will seamlessly schedule the requested media for later broadcasting to the clients. In an aspect of an embodiment, the media server attempts to schedule the requested media for later broadcast so that the restrictive criteria will be satisfied.

In one implementation, the media server maintains a playlist that defines which media are to be broadcast and their sequential order. The media server responds to media requests from clients by updating this playlist to add the requested media. In an aspect of a preferred embodiment, the media server adds the requested media to the playlist so as to comply with restrictions on the timing and frequency of play of the requested media.

This hybrid scheme beneficially provides for both active and passive use by different users at the same time. Users may actively seek a particular media file by looking through an online media library 106 for a selection, while other users can tune into a media broadcast and passively receive a media program as modified by the requests of others. This approach gives users more options than traditional approaches, and it also better satisfies users' preferences. While any preselected media program is likely designed with users' preferences in mind, this hybrid functionality allows the users to affect the media broadcast. Accordingly, the media broadcast more closely mirrors its audience's preferences than would a traditional radio-style broadcast having a rigid playlist composed in advance or at the commencement of the broadcast. Applying certain restrictive criteria to the client requests further ensures a level of quality control and standards in the media broadcast.

In one aspect of the invention, fewer than a substantial number of requested media files are broadcasted within an hour of receiving the corresponding request, or at a time that a user is informed that the requested media file will be broadcasted. Under the DMCA, this allows the media service provider to obtain a statutory license to broadcast copyrighted material. Allowing service provider to comply with the statutory license requirements of the DMCA effectively decouples acquisition of subscription rights from entry to market and delivery of service. A significant barrier to entry for media service providers is thus reduced.

In another aspect of an embodiment, different media broadcasts are distributed over different channels on a network, and clients can tune between and in and out of the various channels. A specific playlist is maintained for managing the media delivery over each channel, as explained above, and clients can make media requests specific to individual channels. Advantageously, the channels can be used to organize the media broadcasts into different categories, or genres. Use of multiple channels also increases the benefit that the media broadcasts, affected by user requests, will better mirror the preferences of the group. As people of like preferences will tend to tune into and make requests from the same channels, passive users will tune into channels affected by other users having similar tastes. These passive users will thus benefit by receiving media broadcasts that reflect the preferences of others with whom they share common media tastes.

In another aspect, users can be distinguished between those who pay a fee to the media service provider (subscribers) and those who do not (non-subscribers). Subscribers are given added rights to access channels in the system and/or to make requests, whereas non-subscribers are given fewer or no rights to request media. People are often reluctant to pay for something before trying it. Giving limited access to non-subscribers allows users to try the service before subscribing to it, while still providing them with an incentive to become subscribers.

DETAILED DESCRIPTION OF THE INVENTION

The following description relates to the delivery of media by a media server 100 to one or more clients 102. It is intended that the term "media" refer to information in any of a wide variety of formats. In this context, the term connotes sound, video images, or a combination of several types of media—sometimes referred to as multimedia.

Figure 1:
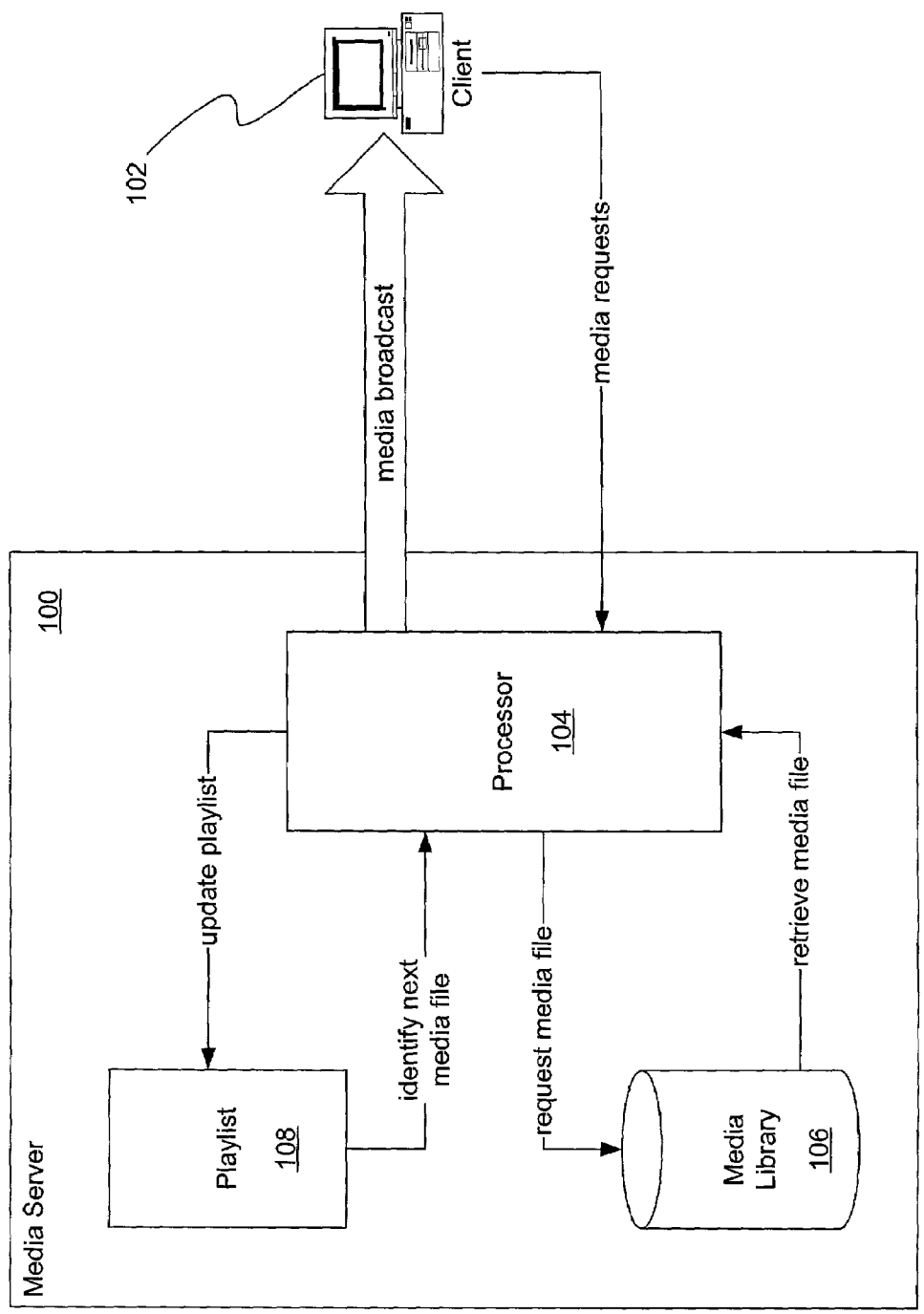
FIG. 1 is a diagram of an embodiment showing communications between components.

FIG. 1 depicts a schematic view of one embodiment, wherein a media server 100 is communicatively coupled to a client 102. In a preferred embodiment, the media server 100 is coupled to multiple clients 102 via a network, such as the Internet; however, only one client 102 is shown in FIG. 1 for purposes of explanation. The media server 100 typically comprises a computer system maintained by an entity such as a media service provider. The client 102 comprises a system owned by a user capable of receiving media over a network, such as a personal computer. Alternatively, the client 102 may be another device equipped to receive and play media, such as a cellular telephone or a personal digital assistant (PDA). As used herein, "network" and "computer network" connote any communications network over which electronic devices can send or receive electronic media.

The media server 100 is adapted to broadcast streaming media to multiple clients 102. To this end, the media server 100 comprises a processor 104 that controls the functionality of the media server 100. The media server 100 further comprises a storage medium for electronically storing a media library 106, which comprises media files used in the broadcasts. The media library 106 may be physically located in a storage device of the media server 100, or it may be located in storage devices remote from the media server 100 but communicatively coupled thereto. For example, the media server 100 may be coupled to the media library 106 over a network 110 (see FIG. 3), wherein the media server 100 retrieves media files from the media storage over the network 110 as the media files are needed for broadcasting.

In a preferred embodiment, the media server 100 maintains a playlist 108 that defines which media are to be broadcast and their sequential order. Preferably, this playlist 108 is stored in a playlist 108 memory on the media server 100, e.g., in the media server's random access memory (RAM). As with the media library 106, the playlist 108 may be stored in a remote memory location and accessed via a network connection.

The media server 100 broadcasts streaming media over the network 110 to the clients 102. In one embodiment, the media server 100 sends media files according to the media playlist 108 to a specific network address (e.g., to an IP address) of the client. Using a combination of hardware and software, the clients 102 receive the media files over the computer network 110 by selecting the same network address to which the media server 100 sends the media files. In this way, clients 102 "tune" in and out of the media server's broadcast.

The media server 100 may broadcast or send media files to multiple network addresses, enabling "channels" to which the clients 102 can tune in and out, e.g., by communicating with the network address associated with each channel. Alternatively, the media server 100 can deliver multiple channels of media by broadcasting the media for each channel to a single IP address, and clients 102 tune into a particular channel by selecting that IP address and using a protocol for selecting from among the broadcasts. The client 102 may employ standard software for receiving the media broadcasts in standard formats, as several commercially available formats and software that enable streaming media and other continuous or seamless media broadcasting are well known in the art.

Upon receiving the media broadcast, each client 102 that is tuned into the broadcast then plays the media files as it receives them. In one embodiment, a complete electronic copy of the media file played is not kept on the client 102. This allows a client 102 to receive and play media without devoting the client's storage space to that media and, more importantly, does not allow unauthorized copies of the media file to be made. In this way, this media delivery scheme can be thought of as "simulated" media delivery. Alternatively, all or a portion of the media files may be retained on the client 102. Keeping all or a portion of the media files on the client 102 saves bandwidth the next time a media file is to be delivered, as it eliminates the need to transfer the entire media file from the media server 100 to the client 102 a second time. In addition, the media server 100 can store all or a portion of the media files in a media database on the client 108, allowing for real-time media delivery with less required bandwidth.

Figure 2:
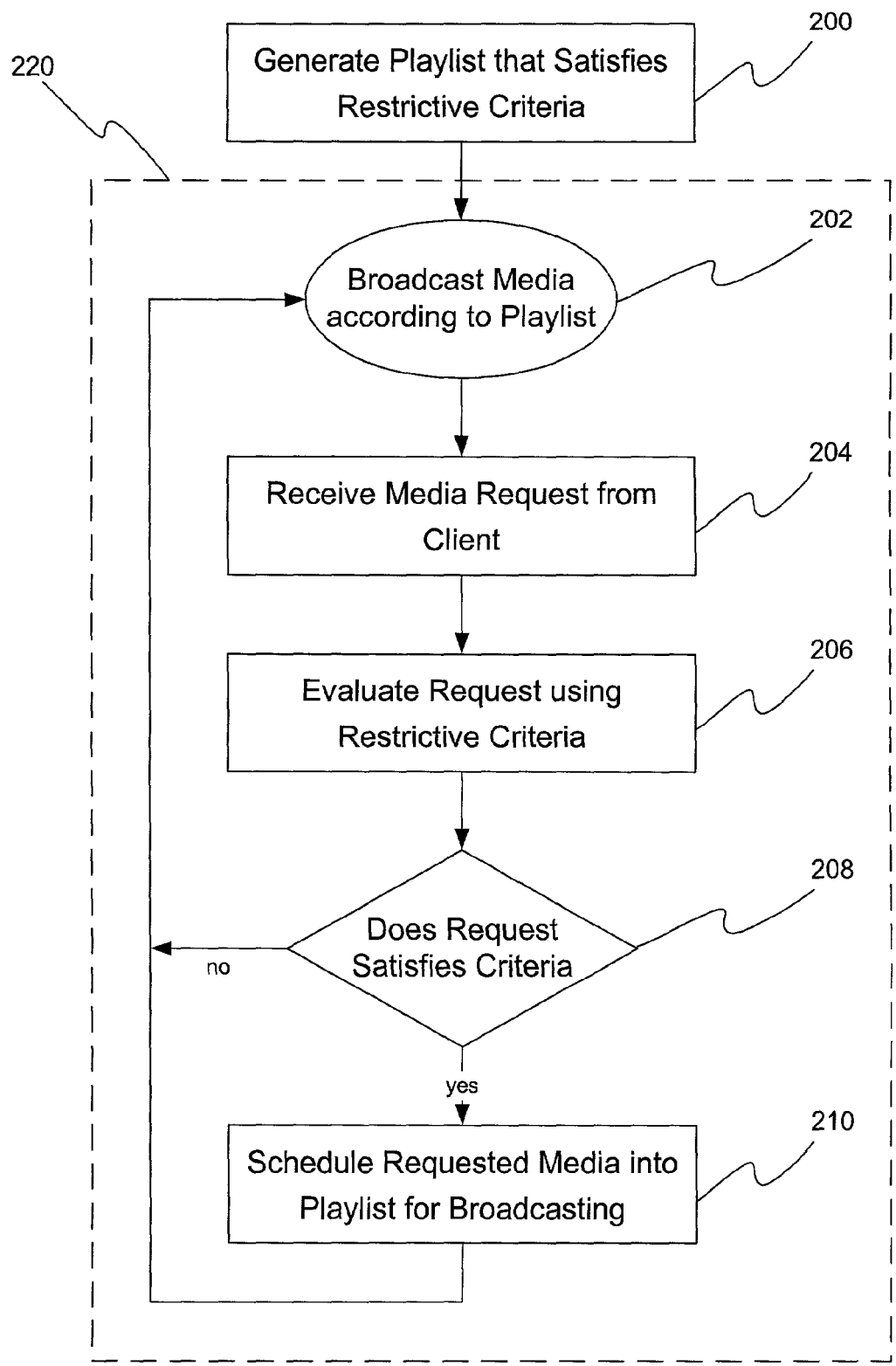
FIG. 2 is a flowchart of an embodiment of the media server request processing functionality.

In addition to receiving media from the media server 100, individual clients 102 can transmit specific media requests to the media server 100 while simultaneously receiving the broadcast. In a preferred embodiment, the processor 104 receives and processes each client's media request during the interactive broadcast 220, as shown in the flowchart of FIG. 2. Before the interactive broadcast 220 begins, the media server 100 generates 200, or is otherwise provided with, all or a portion of a playlist 108 that satisfies a set of restrictive criteria. This playlist 108 is preferably stored in memory (e.g., RAM) at the media server 100. The media server 100 broadcasts 202 media to the plurality of clients 102 in accordance with the playlist 108. The media server 100 is adapted to receive 204 media requests from the clients 102 over the computer network 110. Preferably, the media server 100 can receive 204 and process several media requests from several clients 102 at a time.

Upon receiving 204 a request, the media server 100 evaluates 206 the request using a set of restrictive criteria. In this context, "set" is understood to include a single restrictive criterion. In a preferred embodiment, the restrictive criteria are easily implemented and modified by programming software that controls the processor 104. The set of restrictive criteria may include, for example, one or more conditions that pertain to attributes of the media file. For example, if the media server 100 is programmed to broadcast music of a particular genre, the restrictive criteria might include conditions that would preclude media files outside that genre from being added to the playlist 108. Additionally, the restrictive criteria can specify that the media file cannot have already been played within a predetermined period of time before the request. At a very basic level, the restrictive criteria may simply be that the request is valid, e.g., that it specifies an available media file.

If the media request satisfies 208 the restrictive criteria, the processor 104 schedules 210 the requested media file into the playlist 108 by updating the playlist 108 to incorporate the requested media file. If the request does not satisfy all of the restrictive criteria 208, it is not scheduled 210 into the playlist 108, and the media server 100 continues to broadcast 202 media while waiting for other requests from a client 102. Restrictive criteria may pertain to the playlist 108 itself or to requests for media from the clients 102.

In another preferred embodiment, the restrictive criteria may affect how—in addition to whether—the media server 100 schedules 210 requested media into the broadcast. Preferably, the media server 100 attempts to schedule 210 requested media files into the playlist 108 so as to satisfy the restrictive criteria, if possible. For example, if the restrictive criteria comprise the requirement that the media must not be delivered within an hour of the request, the media server 100 attempts to schedule 210 each request into the playlist 108 so that the requested media will not be delivered within an hour of the request. The media server 100 does not schedule 210 a requested media file into the playlist 108 if it cannot do so and satisfy all of the restrictive criteria.

The playlist 108 provides a guide for the media server 100 to broadcast media to the clients 102. As FIG. 1 shows, the processor 104 of the media server 100 reads the playlist 108 to determine which media file it should broadcast next. After the processor 104 receives the identity of the next media file from the playlist 108, the processor 104 requests that media file from the media library 106. In response, the media library 106 then sends the requested media file to the processor 104 for broadcasting. In this way, the media server 100 thereafter broadcasts media to the clients 102 according to the updated playlist 108, which includes requested media files that satisfy the restrictive criteria.

Figure 3:
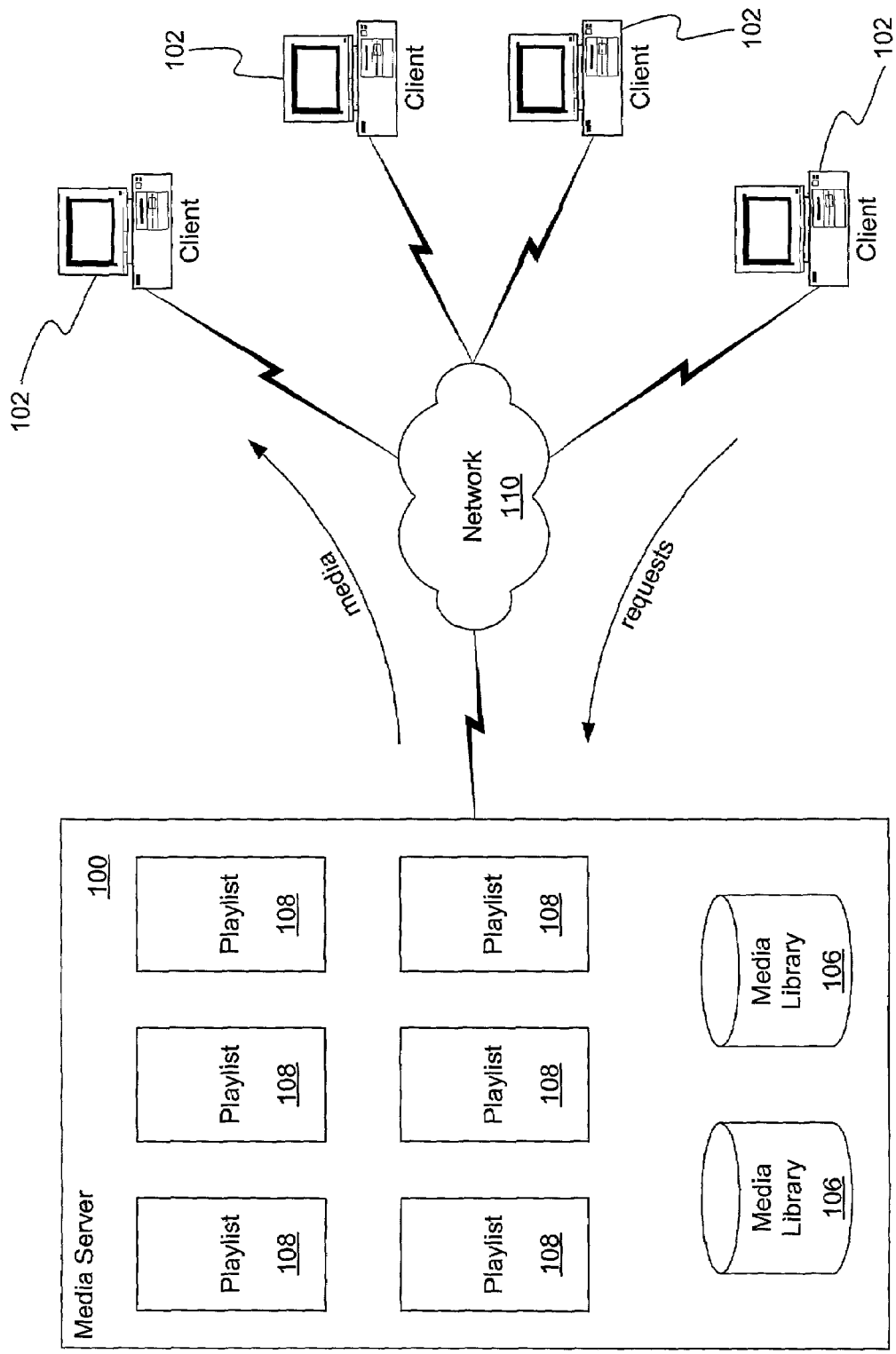
FIG. 3 is a block diagram of the communications connections of an embodiment of the media delivery scheme.

In another embodiment, the media server 100 broadcasts specific programs of media over multiple "channels." Advantageously, the channels can be organized to provide media of different types, categories, or genres. Referring to FIG. 3, the media server 100 maintains a playlist 108 and a channel-specific set of restrictive criteria for each channel on which it broadcasts media. Clients 102 access the channels via a network 110, and can receive media on a channel while simultaneously requesting media for a channel. Each media request specifies a media file and the channel on which the client 102 desires it to be broadcasted. For each channel, when the media server 100 receives 204 a media request, the media server 100 evaluates 206 the request and schedules 210 it into the playlist 108 if the requested media satisfies 208 that channel's restrictive criteria. Accordingly, media requests for each channel affect the media broadcast on that channel if the request satisfies the restrictive criteria associated with the channel.

The restrictive criteria applied to each request may depend on the channel in connection with which the request was made. Using distinct sets of restrictive criteria may beneficially help to maintain the logical character or category of each channel. For example, the media server 100 may broadcast a program of classical music on one channel and a program of rock music on another. The categories of classical and rock music would define two distinct sets of group preferences. Accordingly, the restrictive criteria used in connection with each channel are preferably selected so that media played on each channel must conform to the set of group preferences associated with each channel. If a client 102 were to request a rock music song on the classical music channel, the request would not satisfy the restrictive criteria; therefore, the requested rock song would not be added to the classical music channel's playlist 108. The restrictive criteria thus enable the system to maintain quality control.

One significant roadblock for a business to provide commercial media delivery is the existence of copyrights. Before distributing copyrighted works, such as songs and movies, media service providers must obtain licenses or rights to do so. Often, this requires individually negotiating such licenses from each of the copyright holders—possibly a daunting task for a business desiring to broadcast, e.g., music. The Digital Millennium Copyright Act (DMCA) helps to solve this problem by allowing media service providers to obtain a statutory license on copyrighted works as long as the service is not an "interactive service." Under the DMCA, even if individuals can request specific sound recordings, a service is not "interactive" as long as "the programming on each channel of the service does not substantially consist of sound recordings that are performed within one hour of the request or at a time designated by either the transmitting entity or the individual making such request." Allowing service provider to comply with the statutory license requirements of the DMCA effectively decouples acquisition of subscription rights from entry to market and thus reduces a significant barrier to entry for media service providers.

Accordingly, in an aspect of a preferred embodiment, the system described herein allows media service providers to obtain a statutory license under the DMCA by automatically complying with its provisions. This is accomplished, e.g., through the application of restriction criteria to requested media files, or by scheduling requested files into the playlist 108 so they will be delivered accordance with the DMCA.

Referring to FIG. 2, a requested media file is scheduled 210 into the playlist 108 if the request satisfies 208 certain restrictive criteria. In an embodiment, the processor 104 schedules 210 the media file into the playlist 108 in a way that will comply with the relevant provisions of the DMCA for obtaining a statutory license. Specifically, the processor 104 schedules 210 the media file into the playlist 108 so that the media server 100 will broadcast 202 fewer than a substantial number of requested media files (1) within an hour of receiving 204 the request for the corresponding media file, or (2) at a time that a client 102 is informed that the requested media file will be broadcast 202.

The processor 104 can be programmed to schedule 210 the media files to the playlist 108 in accordance with any algorithm, such as those described above for complying with the DMCA. The processor 104 can access data associated with each media file in the playlist 108 regarding a length of time that the media file takes to play. The processor 104 is further communicatively coupled to a memory for storing data relating to each request, such as the identity of the requested item and the time of the request. Before scheduling 210 a media files into a position in the playlist 108, the processor 104 uses these data to calculate whether the media file will be broadcast 202 with an hour of the request or at a time that a client 102 is informed that the requested media file will be broadcast 202. Accordingly, the processor 104 is programmed to schedule 210 fewer than a substantial number of media files at these times. In this context, a "substantial" number of media files corresponds to the number of recordings that will disallow a statutory license under the DMCA.

In a preferred embodiment, some media files (but fewer than a substantial number) are scheduled 210 into the playlist 108 so that they will be delivered to the clients 102 soon—i.e., within an hour—after their corresponding request. The remaining files are scheduled 210 to be delivered more than one hour after the request therefor. In addition, the requested media files may be scheduled 210 at random positions in the playlist 108, rather than at its end. Advantageously, these two features ensure that the users will not know or be able to reliably predict when the media they request will be delivered. This, in turn, requires the users to access the media server's broadcast for longer periods of time, waiting for the requested media to be delivered.

Clients 102 can access the media server 100 using standard software, such as a web browser or media player, which a user could download and install on the client 102. In the case of using a standard browser, the features would be implemented by web software on the media server 100, with which the clients 102 could interact. There currently exist several standard players for streaming media that can be used in connection with web browsers. With custom software, however, the media server 100 can deliver more customized services to the clients 102, and the interaction between the media server 100 and clients 102 can be optimized.

The client software may be designed with several features to enhance the media delivery. For example, in preferred embodiments, the software allows the users to tune to various channels offered by the media server 100. In addition, the client software may recommend channels to a user based on past usage. One particularly advantageous feature is allowing the client 102 to search all or part of the available media files in the media library 106. Using an interactive search much like those available for single file request systems, a user specifies certain search parameters for the desired media. The media server 100 then delivers search results to the client 102, and the user may advantageously directly request media files from the list of search results. While broadcasting a particular media file, the client software may display information relating to the current media being delivered (e.g., artist information, title of song, etc.) and allow the user to purchase the media. Additionally, the client software may display advertising, which could be targeted to the user depending on available information such as channel selections and the user's previous media requests.

In an aspect of a preferred embodiment, the system distinguishes users between those who pay a subscription fee to the media service provider (subscribers) and those who do not (non-subscribers). The non-subscribers are given limited access or rights to the media broadcast compared to the subscribers. Recognizing that people are often reluctant to purchase something before trying it, this allows non-subscribers to access the media service before subscribing to it but still provides an incentive for the non-subscribers to become subscribers. Various subscription schemes can be envisioned and are enabled by the present system. In one such scheme, all users are given rights to access channels and receive broadcasts thereon, but only subscribers are allowed to make requests. This is easily implemented by requiring as one of the restrictive criteria that the media request originate from a subscriber. Alternatively, by programming the client 102 and/or media server software, non-subscribers can be given lesser (e.g., a limited number of requests) or no rights to request media or limited access to the channels.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims.

We claim:

1. A computer implemented method of delivering digital media items to a user electronic device, the method comprising:
   obtaining at the computer a playlist comprising a sequentially ordered plurality of digital media items that satisfies a set of restrictive criteria, wherein the set of restrictive criteria includes a condition that would preclude a media file from being slaved within a defined period of time;
   playing said playlist by the computer, wherein playing said playlist comprises sequentially delivering to the user electronic device, via a computer network, said sequentially ordered plurality of digital media items; and
   while the computer is playing the playlist:
      receiving, from the user electronic device, an indication to add a requested digital media item to the playlist;
      evaluating whether adding the requested digital media item to the playlist would satisfy the set of restrictive criteria; and
      when the set of restrictive criteria is satisfied, selectively adding the requested digital media item to the playlist for delivery to the user electronic device subsequent to receipt of the request.

2. The method of claim 1, wherein the set of restrictive criteria comprises whether the playlist satisfies a set of group preferences.

3. The method of claim 1, wherein the adding comprises inserting a requested media item at a random position in the playlist.

4. The method of claim 1, wherein the adding comprises:
   attempting to add the requested media item to a position in the playlist so that the modified playlist satisfies the set of restrictive criteria; and disregarding the request if the requested media item cannot be added to the playlist so that the modified playlist would satisfy the set of restrictive criteria.

5. The method of claim 4, wherein the set of restrictive criteria comprises whether the playlist complies with the Digital Millennium Copyright Act requirement for obtaining a statutory license.

6. The method of claim 1, wherein the delivering media items comprises broadcasting media items to the user electronic device, and wherein said set of restrictive criteria comprises whether fewer than a substantial number of media items are delivered.

7. The method of claim 6, wherein the delivering media items further comprises broadcasting media items to the user electronic device, and wherein said set of restrictive criteria comprises whether fewer than a substantial number of media items are delivered at a time that the user electronic device is informed the requested media items will be delivered.

8. The method of claim 1, wherein delivering the media items comprises broadcasting media items to the user electronic device so that the media items are delivered in compliance with the Digital Millennium Copyright Act requirement for obtaining a statutory license.

9. The method of claim 1, further comprising:
providing a searchable database of media items that allows at least one of the user electronic devices to search the database by a set of media attributes;
receiving a request from one or more of the user electronic devices for a media item from the database; and
selectively adding the requested media item from the database to the playlist if the modified playlist would satisfy the set of restrictive criteria.

10. The method of claim 1, wherein the adding comprises limiting the number of requests from the user electronic device.

11. The method of claim 1, wherein the media items are sound recordings.

12. The method of claim 1, wherein the set of restrictive criteria includes a condition that would preclude a media file from outside a defined genre from being added to the playlist.

13. The method of claim 2, wherein the set group preferences defines one of a genre, type or category of a channel.

14. One or more media servers for delivering digital media files to a plurality of client electronic devices over a computer network, the one or more media servers comprising:
a network connection for communicatively coupling one or more of the media servers with the plurality of client electronic devices over the network;
a playlist memory containing a playlist, wherein the playlist comprises a sequentially ordered plurality of digital media items that satisfies a set of restrictive criteria, wherein the set of restrictive criteria includes a condition that would preclude a media file from being slaved within a defined period of time;
a media storage memory containing a library of the digital media files; and a processor coupled with the network connection, the playlist memory, and the media storage memory, the processor operative to:
play the playlist by transmitting digital media files according to the sequential order indicated by the playlist from the media storage memory to the plurality of client electronic devices over the computer network; and
while the playlist is playing:
evaluate requests to add a requested digital media item to the playlist from one or more of the client electronic devices using the set of restrictive criteria; and
upon at least one of the requests satisfying the set of restrictive criteria, add an indication of the requested digital media file to the playlist for delivery to the user electronic device subsequent to receipt of said at least one of the requests.

15. The one or more media servers of claim 14, wherein the one or more media servers broadcast fewer than a substantial number of digital media files within an hour of receiving the request for a corresponding digital media file, or at a time that at one client electronic device is informed that the requested digital media file will be broadcast.

16. The one or more media servers of claim 14, wherein the set of restrictive criteria comprise whether the playlist satisfies a set of group preferences.

17. The one or more media servers of claim 14, wherein the digital media files are digital sound files.

18. The one or more media servers of claim 14, wherein:
the playlist memory contains a plurality of playlists, each playlist corresponding to a network media channel;
the processor is adapted to receive requests for digital media files from the plurality of client electronic devices, each request being associated with a network media channel, wherein the processor evaluates each request using one or more restrictive criteria and, if the playlist including the requested digital media file would satisfy the set of restrictive criteria, adds the requested digital media file to the playlist; and
the one or more media servers broadcast digital media files sequentially to the network on each of the plurality of network media channels according to each corresponding playlist.

19. The one or more media servers of claim 18, wherein, for each network media channel, the one or more media servers broadcast fewer than a substantial number of requested digital media files within an hour of receiving at least one of the requests for the corresponding digital media file, or at a time that at least one of the client electronic devices is informed that the requested digital media file will be broadcast.

20. The one or more media servers of claim 18, wherein the set of restrictive criteria comprises a set of group preferences to each network media channel.

* * * * *

UNITED STATES PATENT AND TRADEMARK OFFICE
CERTIFICATE OF CORRECTION

PATENT NO.       : 7,689,705 B1                                    Page 1 of 1
APPLICATION NO.  : 10/021752
DATED            : March 30, 2010
INVENTOR(S)      : James P. Lester and Alexander J. Kirk It is certified that error appears in the above-identified patent and that said Letters Patent is hereby corrected as shown below:

Col. 8, claim 1, line 8 "media file from being slaved within a defined period of..." should be changed to --media file from being played within a defined period of...--

Col. 9, claim 14, line 11 "that would preclude a media file from being slaved..." should be changed to --that would preclude a media file from being played...--

Signed and Sealed this

Sixth Day of July, 2010

David J. Kappos
*Director of the United States Patent and Trademark Office*